(12) United States Patent
Bugli

(10) Patent No.: US 6,464,761 B1
(45) Date of Patent: Oct. 15, 2002

(54) AIR INDUCTION FILTER ASSEMBLY

(75) Inventor: Neville Jimmy Bugli, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/470,410

(22) Filed: Dec. 22, 1999

(51) Int. Cl.[7] .............................................. B01D 46/00
(52) U.S. Cl. .......................... 96/135; 55/487; 55/524; 55/385.3; 55/DIG. 24; 55/DIG. 42; 123/198 E
(58) Field of Search ........................ 96/134, 135, 136, 96/147, 153, 154, 121, 131, 132; 55/486, 487, 524, DIG. 13, DIG. 24, DIG. 42, 385.3; 123/198 E

(56) References Cited

U.S. PATENT DOCUMENTS

| | | | |
|---|---|---|---|
| 2,822,059 A | * 2/1958 | Lunn et al. ..................... 55/487 |
| 2,966,960 A | 1/1961 | Rochlin | |
| 3,221,724 A | 12/1965 | Wentworth ................... 96/109 |
| 3,477,210 A | 11/1969 | Hervert ....................... 96/144 |
| 3,541,765 A | 11/1970 | Adler et al. .................. 96/138 |
| 3,572,013 A | 3/1971 | Hansen ......................... 96/138 |
| 3,665,906 A | 5/1972 | De Palma ................... 123/136 |
| 3,721,072 A | 3/1973 | Clapham .................. 55/514 X |
| 4,259,096 A | * 3/1981 | Nakamura et al. ....... 156/306.6 |
| 4,418,662 A | * 12/1983 | Engler et al. ................. 55/515 |
| 4,629,479 A | 12/1986 | Cantoni ....................... 55/316 |
| 4,631,077 A | 12/1986 | Spicer et al. ................. 55/487 |
| 4,684,382 A | * 8/1987 | Abu-Isa ........................ 55/522 |
| 4,684,510 A | 8/1987 | Harkins ...................... 423/210 |
| 4,758,460 A | * 7/1988 | Spicer et al. ............... 427/244 |
| 4,938,787 A | 7/1990 | Simmerlein-Erlbacher | |
| 5,221,573 A | * 6/1993 | Baigas, Jr. .................... 2/243.1 |
| 5,338,253 A | 8/1994 | Damsohn et al. ........... 454/158 |
| 5,350,444 A | * 9/1994 | Gould et al. ................... 96/154 |
| 5,437,701 A | 8/1995 | Townsley .................... 55/486 |
| 5,453,118 A | * 9/1995 | Heiligman ................... 55/524 |
| 5,478,379 A | * 12/1995 | Bevins ......................... 55/356 |
| 5,573,811 A | 11/1996 | Townsley ................... 427/244 |
| 5,762,692 A | * 6/1998 | Dumas et al. ................. 96/141 |
| 5,871,569 A | 2/1999 | Ochler et al. ................. 96/153 |
| 5,891,207 A | 4/1999 | Katta ......................... 55/385.3 |
| 6,136,075 A | * 10/2000 | Bragg et al. ................... 96/135 |
| 6,156,089 A | * 12/2000 | Stemmer et al. .............. 55/467 |
| 6,231,646 B1 | * 5/2001 | Schweizer et al. ............. 96/17 |

FOREIGN PATENT DOCUMENTS

| | | |
|---|---|---|
| DE | 19505723 A1 * | 8/1996 |
| EP | 0 591 673 A1 | 4/1994 |
| GB | 2 138 695 | 10/1984 |

* cited by examiner

Primary Examiner—David A. Simmons
Assistant Examiner—Frank M. Lawrence
(74) Attorney, Agent, or Firm—Larry I. Shelton

(57) ABSTRACT

An air induction filter assembly includes a housing and a plurality of filter layers disposed in the housing. One of the filter layers is a carbon impregnated polyurethane foam layer to remove residual hydrocarbon (HC) vapors diffusing through an air inlet to the filter.

20 Claims, 3 Drawing Sheets

AIR INDUCTION FILTER ASSEMBLY

BACKGROUND OF THE INVENTION

1. Field of the Invention

The present invention relates generally to filters and, more specifically, to an air induction filter assembly for both automotive and non-automotive air intake applications.

2. Description of the Related Art

It is known to provide an air induction filter for an engine of a motor vehicle to filter out contaminants in air entering the engine. In the past, the air induction filter was typically made of pleated paper housed in a plastic or metal frame. The air induction filter and frame were mounted in an engine compartment of the motor vehicle. These air induction filters were used once and discarded.

Currently, the reticulated foam filter is typically made of a foam material and housed in a plastic housing made out of glass filled nylon due to the high temperatures in the engine compartment. The foam material is several layers thick. An example of such an air induction filter is disclosed in U.S. Pat. No. 5,437,701. In this patent, the air induction filter has a molded or extruded housing which contains several layers of filter material. The layers can be either relatively thin or thick and treated or untreated. If the layer is treated, it contains an additive such as oil.

It is also known that virtually all components in the motor vehicle contribute to evaporative emissions. It has been established that there is a significant amount of hydrocarbon vapors (15 mg of gasoline per injector) in a range of about 150 to 300 mg per day escaping through an air inlet of the engine as measured by a shed test known in the art. These emissions are emitted by raw fuel in the inlet manifold and some leakage through the injectors.

Therefore, it is desirable to provide an air induction filter that will adsorb some of the hydrocarbon vapors. It is also desirable to provide an air induction filter that will control contaminants entering the engine and will remove hydrocarbon vapors exiting from the engine at the same time. It is desirable to provide an air induction filter that has 150,000 miles of service for automotive applications and extended service life for non-automotive applications. It is further desirable to provide an air induction filter that will not require servicing up to 150,000 miles under normal driving conditions. Therefore, there is a need in the art to provide an air induction filter assembly that meets these desires.

SUMMARY OF THE INVENTION

Accordingly, the present invention is an air induction filter assembly including a housing and a filter disposed in the housing. The filter has a plurality of layers with one of the layers being a carbon impregnated foam layer to remove residual hydrocarbon (HC) vapors diffusing through an air inlet to the filter.

One advantage of the present invention is that a new air induction filter assembly is provided for an engine of a motor vehicle. Another advantage of the present invention is that the air induction filter assembly uses reticulated multi-layered foam with carbon impregnation to remove residual hydrocarbon (HC) vapors diffusing through the inlet manifold of the engine after the engine is shut-off. Yet another advantage of the present invention is that the air induction filter assembly will control contaminants and hydrocarbon vapors at the same time. Still another advantage of the present invention is that the air induction filter assembly has a long life and may require no changing or servicing up to 150,000 miles under normal driving conditions. A further advantage of the present invention is that the air induction filter assembly has low restriction of the carbon impregnated layer, which protects against shedding of carbon particles, i.e. the carbon is contained. Yet a further advantage of the present invention is that the air induction filter assembly has a carbon impregnated layer that is protected against dust, water and snow. Still a further advantage of the present invention is that the air induction filter assembly has reduced weight, cost, parts and complexity. Another advantage of the present invention is that the air induction filter assembly has packaging flexibility (shape and size) and can be packaged outside an engine compartment of the motor vehicle. Yet another advantage of the present invention is that the air induction filter assembly has lower inlet air temperatures, resonator requirements, and noise.

Other features and advantages of the present invention will be readily appreciated, as the same becomes better understood after reading the subsequent description when taken in conjunction with the accompanying drawings.

DESCRIPTION OF THE PREFERRED EMBODIMENT(S)

Figure 1:
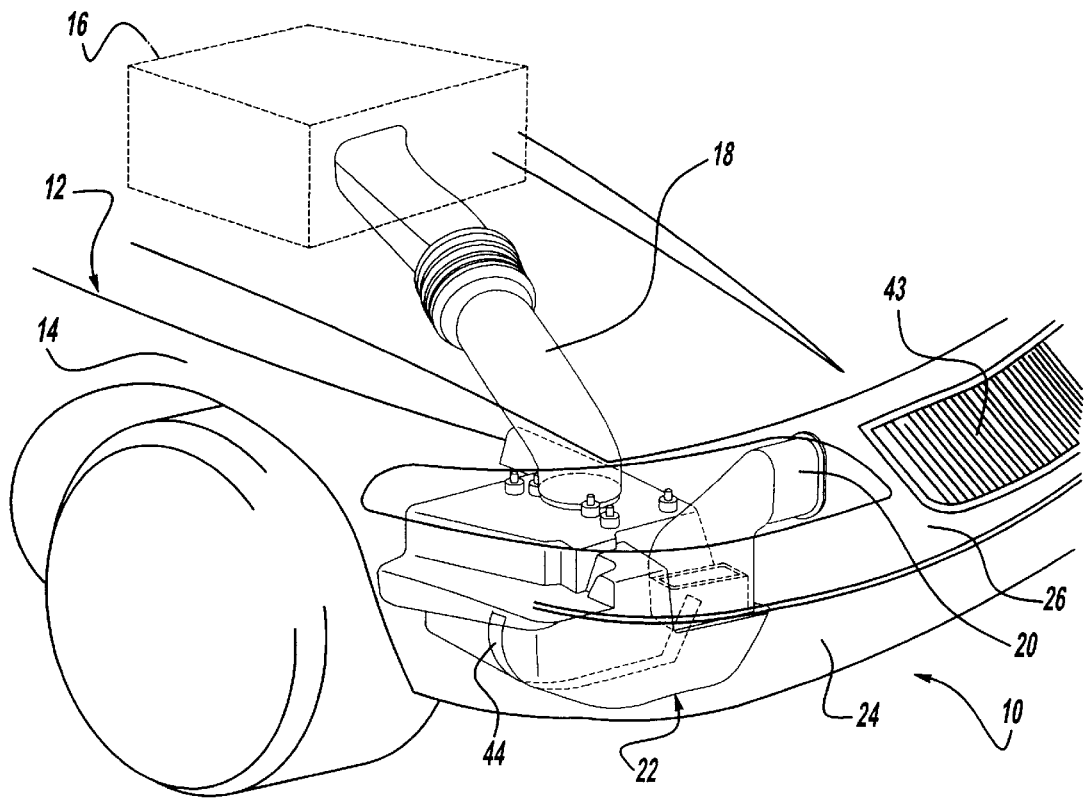
FIG. 1 is a perspective view of an air induction filter assembly, according to the present invention, illustrated in operational relationship with an engine of a vehicle.
Figure 2:
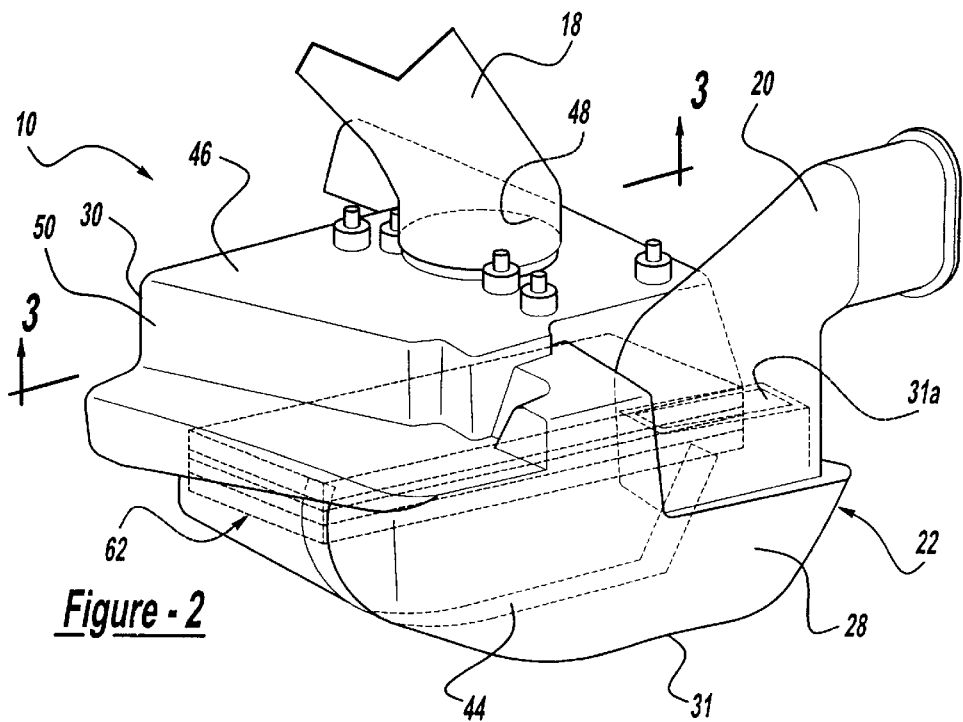
FIG. 2 is an enlarged perspective view of the air induction filter assembly of FIG. 1.
Figure 3:
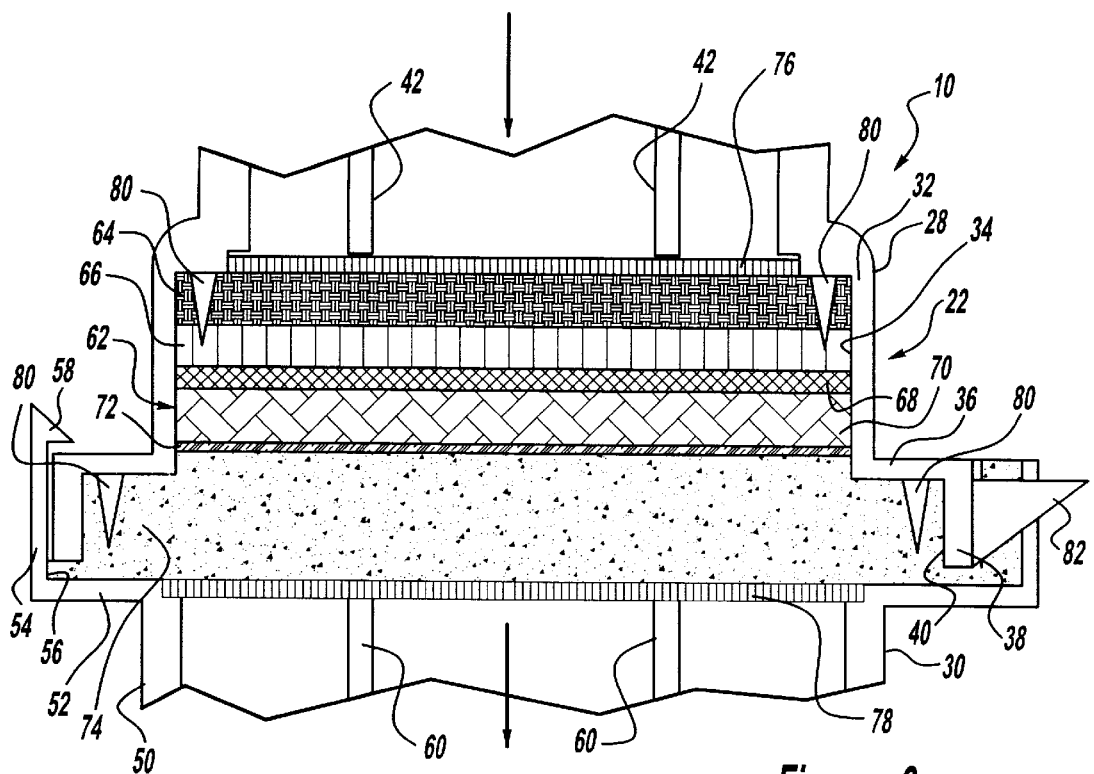
FIG. 3 is a sectional view taken along line 3—3 of FIG. 2.

Referring now to the drawings and in particular FIG. 1 through 3, one embodiment of an air induction filter assembly 10, according to the present invention, is shown for a motor vehicle, generally indicated at 12. The motor vehicle 12 includes a vehicle body 14 and an engine 16 mounted to the vehicle body 14. The motor vehicle 12 includes an air outlet tube 18 operatively connected to a throttle body (not shown) of the engine 16 and to the air induction filter assembly 10. The motor vehicle 12 also includes an air inlet tube 20 operatively connected to the air induction filter assembly 10. The air induction filter assembly 10 is also mounted to the vehicle body 14 by suitable means such as fasteners (not shown). It should be appreciated that, except for the air induction filter assembly 10, the motor vehicle 12 is conventional and known in the art. It should also be appreciated that the air induction filter assembly 10 may be used for non-automotive air intake applications such as HVAC applications, compressor intake, turbine air intake, indoor air, etc.

The air induction filter assembly 10 includes a housing, generally indicated at 22. The housing 22 is mounted by suitable means (not shown) to the vehicle body 14, preferably outside of an engine compartment (not shown) behind a bumper 24 and front fascia 26. The housing 22 includes an air cleaner tray 28 and an air cleaner cover 30. The air cleaner tray 28 is generally rectangular in shape, but may have any suitable shape. The air cleaner tray 28 includes a base wall 31 having an opening 31a for connection to the air inlet tube 20. The base wall 46 is generally planar and may be rectangular in shape or any other suitable shape dictated by packing space requirements. The air cleaner tray 28 has a side wall 32 forming a first cavity 34 and a first flange 36 extending generally perpendicularly to the side wall 32 and a second flange 38 extending generally perpendicularly to the first flange 36 to form a second cavity 40. The air cleaner tray 28 also has a plurality of support posts 42 extending longitudinally and spaced laterally from the side wall 32 for stiffing the air cleaner tray 28 and reduce noise. The air cleaner tray 28 is made of a relatively rigid material, preferably a plastic material such as polypropylene. The air cleaner tray 28 is a monolithic structure being integral, unitary and one-piece. It should be appreciated that the air cleaner tray 28 is operatively connected to the air inlet tube 20 which extends to a point above the bumper 24 and in a grill opening 43 to lessen a potential for snow and water ingestion. It should also be appreciated that the air cleaner tray 28 may be supported by a strap 44 attached by suitable means such as fasteners (not shown) to the vehicle body 14.

The air cleaner cover 30 includes a base wall 46 having an opening 48 for connection to the air outlet tube 18. The base wall 46 is generally planar and may be rectangular in shape or any other suitable shape dictated by packing space requirements. The air cleaner cover 30 also has a side wall 50 extending generally perpendicular from the base wall 46 and a first flange 52 extending perpendicularly to the side wall 50. The air cleaner cover 30 also includes a second flange 54 extending perpendicularly to the first flange 52 to form a cavity 56. The second flange 54 may include a projection 58 extending laterally and inwardly to overlap the second flange 38 of the air cleaner tray 28. The air cleaner cover 30 may include a plurality of support posts 60 extending longitudinally and spaced laterally from the side wall 50 to stiffen the air cleaner cover 30 and reduce noise. The air cleaner cover 30 is made of a relatively rigid material, preferably a plastic material such as polypropylene. The air cleaner cover 30 is a monolithic structure being integral, unitary and one-piece. It should be appreciated that the air cleaner cover 30 is operatively connected to the air outlet tube 18. It should also be appreciated that the housing 22 may have any suitable shape and size for the filter 62 to be described.

The air induction filter assembly 10 includes a filter, generally indicated at 62, disposed in the housing 22 to filter contaminants from the air to the engine 16 and absorb hydrocarbon vapors from the engine 16. The filter 62 is generally rectangular in shape, but may have any suitable shape, preferably complementary to the cavities 34 and 40. The filter 62 is also oversized relative to the cavity 34 to create an interference fit between the filter 62 and the air cleaner tray 28. The filter 62 is multi-layered and includes a plurality of individual and separate layers 64,66,68,70,72,74. Preferably, the filter 62 has four to six layers 64,66,68,70,72,74. The layers 64,66,68,70,72,74 are made of a foam material, preferably an open cell or reticulated foam, more preferably reticulated "open cell" polyurethane foam. The density of the open cell foam is about 1.75 lb./cuft or 796 gms/cuft or 28111 gms/cuM. The filter 62 has selective layers, which may be treated with a tackifier. It should be appreciated that the reticulated foam has about 97% porosity, which is beneficial to airflow.

Figure 4:
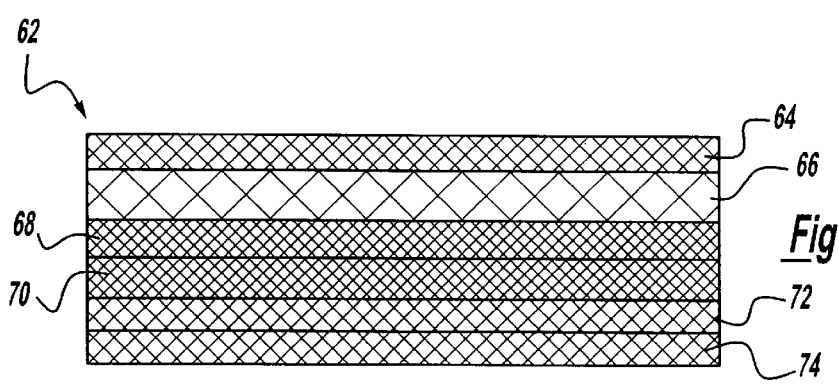
FIG. 4 is an enlarged fragmentary view of a filter for the air induction filter assembly of FIG. 1.

As illustrated in FIGS. 3 and 4, the filter 62 has six layers 64,66,68,70,72,74. Adjacent the air cleaner tray 28 is a pre-filter layer 64. The pre-filter layer 64 is relatively thin and is dry or untreated. The pre-filter layer 64 has a predetermined thickness such as in a range of 0.25 inches to 0.75 inches. The pre-filter layer 64 has approximately fifteen (15) to approximately forty-five (45) pores per inch (ppi) foam. It should be appreciated that the pre-filter layer 64 has a coarse porosity foam media. It should also be appreciated that the pre-filter layer 64 is conventional and known in the art.

The filter 62 also includes a carbon impregnated layer 66 adjacent the pre-filter layer 64. The carbon impregnated layer 66 has a predetermined thickness such as in a range of 0.25 inches to 0.75 inches. The carbon impregnated layer 66 is a carbon impregnated foam having carbon present in an amount of one hundred percent (100%) by weight to three hundred percent (300%) by weight of the foam layer. The carbon impregnated layer 66 has approximately fifteen (15) to approximately thirty (30) pores per inch (ppi) foam. The carbon impregnated layer 66 could also be made up of an open fibrous felt (non-woven) layer with coarse fibers. The permeability of such layer may be greater than 500 cfm Frazier. The felt layer will have coarse fibers in a range of about 50 $\mu$m to about 100 $\mu$m. It should be appreciated that the foam will have enough carbon to remove a majority of the HC vapors being generated in the engine 16. It should also be appreciated that the carbon impregnated layer 66 is optional for non-automotive applications.

The filter 62 includes a first post-carbon layer 68 disposed adjacent the carbon impregnated layer 66. The first post-carbon layer 68 is relatively thin and is dry or untreated. The first post-carbon layer 68 has a predetermined thickness such as 0.25 inches to 0.75 inches. The first post-carbon layer 68 has approximately forty-five (45) to approximately eighty-five (80) pores per inch (ppi) foam. The first post-carbon layer 68 may or may not be treated with a tackifier such as oil. If treated, the first post-carbon layer 68 will have about twenty-five (25%) to about seventy-five (75%) by weight of oil. It should be appreciated that the first post-carbon layer 68 has a medium porosity foam media. It should also be appreciated that the first post-carbon layer 68 is conventional and known in the art.

The filter 62 includes a second post-carbon layer 70 disposed adjacent the first post-carbon layer 68. The second post-carbon layer 70 is relatively thin and is treated with a tackifier such as oil. The oil is approximately twenty-five percent (25%) to approximately seventy-five percent (75%) by weight of the foam layer. The second post-carbon layer 70 has a predetermined thickness such as 0.25 inches to 0.75 inches. The second post-carbon layer 70 has approximately forty-five (45) to approximately eighty (80) pores per inch (ppi) foam. It should be appreciated that the second post-carbon layer 70 has a medium porosity foam media. It should also be appreciated that the second post-carbon layer 70 is conventional and known in the art.

The filter 62 includes a third post-carbon layer 72 disposed adjacent the second post-carbon layer 70. The third post-carbon layer 72 is relatively thin and is treated with a tackifier such as oil. The oil is approximately twenty-five percent (25%) to approximately fifty percent (50%) by weight of the foam layer. The third post-carbon layer 72 has a predetermined thickness such as 0.25 inches to 0.5 inches. The third post-carbon layer 72 has approximately eighty (80) to approximately one hundred (100) pores per inch (ppi) foam. It should be appreciated that the third post-carbon layer 72 has a fine porosity foam media. It should also be appreciated that the third post-carbon layer 72 is conventional and known in the art.

The filter 62 includes a fourth post-carbon layer 74 disposed adjacent the third post-carbon layer 72. The fourth post-carbon layer 74 is relatively thin and is dry or untreated. The fourth post-carbon layer 74 has a predetermined thickness such as 0.25 inches to 0.5 inches. The fourth post-carbon layer 74 has approximately eighty (80) to approximately one hundred (100) pores per inch (ppi) foam. Alternatively, the fourth post-carbon layer 74 may be treated with a tackifier such as oil. The oil is approximately twenty-five percent (25%) to approximately fifty percent (50%) by weight of the foam layer. It should be appreciated that the fourth post-carbon layer 74 has a fine porosity foam media. It should also be appreciated that the fourth post-carbon layer is conventional and known in the art. It should further be appreciated that the layers 64,66,68,70,72,74 may be adhesively secured together to form an integral and one-piece filter 62.

The air induction filter assembly 10 may include a screen 76 disposed adjacent one side of the filter 62 between the support posts 42 of the air cleaner tray 28 and the pre-filter layer 64 of the filter 62. The air induction filter assembly 10 may also include a screen 78 disposed adjacent the other side of the filter 62 between the support posts 60 of the air cleaner cover 30 and the fourth post-carbon layer 74. The screens 76 and 78 filter larger particulate matter before it contacts the filter 62 to protect the filter 62. The screens 76 and 78 compress the layers 72 and 74 of foam of the filter 62 approximately five percent (5%) of its original thickness. The screen 78 and flanges 36 and 52 may compress the layers 72 and 74 or just layer 74 to achieve a firmness of about 10 to about 20 to provide a sealing surface. It should be appreciated that the screens 76 and 78 are optional.

The air induction filter assembly 10 may include at least one, preferably a plurality of darts 80 extending from the side wall 32 and first flange 36 of the air cleaner tray 28 to prevent the filter 62 from pulling away from the housing 22. The highly compressed filter 62 and darts 80 prevent leakage of unfiltered air past the filter 62, resulting in increased reliability. Alternatively, instead of darts, a continuous staggered compression bead on flanges 36 and 52 may be used to provide additional sealing integrity. It should be appreciated that the darts penetrate the filter 62 and hold it in place.

The air induction filter assembly 10 may include an interlocking mechanism 82 such as a dart extending laterally from the second flange 38 of the air cleaner tray 28 when the housing 22 is snapped closed. The compressed foam layers between the air cleaner tray 28 and air cleaner cover 30 act like a spring to hold the assembly 10 together tightly and also keeps the entire assembly 10 from rattling.

The air cleaner cover 30 and the fine porosity foam layers 72 and 74 of the filter 62 may be oversized relative to the air cleaner tray 28 to allow the air cleaner tray 28 to compress the layers 72 and 74. The fine porosity foam layers 72 and 74 will be compressed to achieve a firmness of about 5 to 7 such that it is highly compressed to seal the assembly 10. This also allows the foam of the filter 62 to be visible along cover/tray interface to verify that the filter 62 is inserted into the housing 22 properly during assembly and serves as an assembly check. It should be appreciated that the highly compressed layer of foam will repel water and reduce the risk of ingestion through the cover/tray interface.

In operation of the air induction filter assembly 10, air enters the air inlet tube 20 and flows through the air cleaner tray 28 to the filter 62. The screen 76 in the air cleaner tray 28 filters particulate matter in the inlet air. The screened inlet air flows through the layers 64,66,68,70,72,74 of the filter 62, which filter contaminants from the inlet air. The filtered air flows through the screen 78 in the air cleaner cover 30 and into the air outlet tube 18 to the engine 16. When the engine 16 is turned off, residual HC vapors diffuse from the inlet manifold through the air outlet tube 18 and air cleaner cover 30 to the filter 62. The vapors are absorbed by the carbon impregnated layer 66 of the filter 62.

Figure 5:
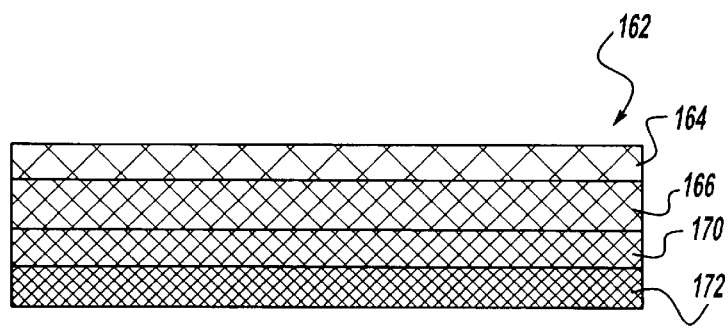
FIG. 5 is a view similar to FIG. 4 of another embodiment, according to the present invention, of the filter for the air induction filter assembly of FIG. 1.

Referring to FIG. 5, another embodiment 162, according to the present invention, of the filter 62 of the air induction filter assembly 10 is shown. Like parts of the filter 62 have like reference numerals increased by one hundred (100). In this embodiment, the filter 162 includes the pre-filter layer 164 and the carbon impregnated layer 166. The filter 162 includes a first post-carbon layer 170 disposed adjacent the carbon impregnated layer 166. The filter 162 includes a second post-carbon layer 172 disposed adjacent the first post-carbon layer 170. The first post-carbon layer 170 is relatively medium porosity foam media and is treated with a tackifier such as oil. The first post-carbon layer 170 has a predetermined thickness such as 0.5 inches to 1.0 inches. The first post-carbon layer 170 has approximately forty-five (45) to approximately sixty-five (65) pores per inch (ppi) foam. It should be appreciated that the first post-carbon layer 170 is conventional and known in the art.

The second post-carbon layer 172 is relatively fine porosity foam media and is treated with a tackifier such as oil. The second post-carbon layer 172 has a predetermined thickness such as 0.25 inches to 0.5 inches. The second post-carbon layer 172 has approximately eighty (80) to approximately one hundred (100) pores per inch (ppi) foam. It should be appreciated that the second post-carbon layer 172 is conventional and known in the art. It should also be appreciated that the filter 162 operates similar to the filter 62.

Figure 6:
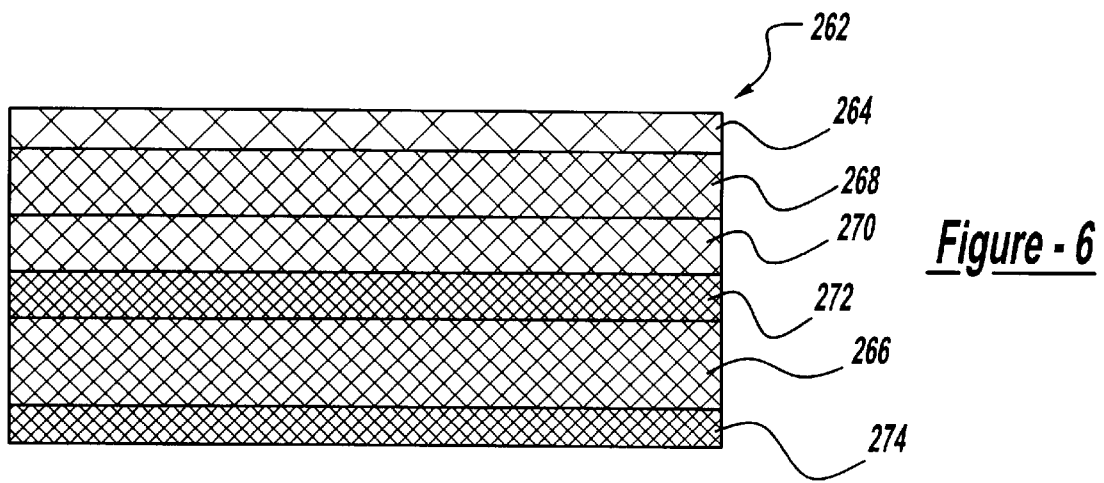
FIG. 6 is a view similar to FIG. 4 of yet another embodiment, according to the present invention, of the filter for the air induction filter assembly of FIG. 1.

Referring to FIG. 6, yet another embodiment 262, according to the present invention, of the filter 62 of the air induction filter assembly 10 is shown. Like parts of the filter 62 have like reference numerals increased by two hundred (200). In this embodiment, the filter 262 includes the pre-filter layer 264 and a first pre-carbon layer 268 disposed adjacent the pre-filter layer 264. The filter 262 includes a second pre-carbon layer 270 disposed adjacent the first pre-carbon layer 268. The filter 262 includes a third pre-carbon layer 272 disposed adjacent the second pre-carbon layer 270. The filter 262 includes the carbon impregnated layer 266 disposed adjacent the third pre-carbon layer 272. The filter includes the post-carbon layer 274 disposed adjacent the carbon impregnated layer 266. The operation of the filter 262 is similar to the filter 62.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An air induction filter assembly comprising:
   a housing;
   a filter disposed in said housing; and
   said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter.

2. An air induction filter assembly as set forth in claim 1 wherein said pre-filter foam layer is disposed on an air inlet side of said carbon impregnated foam layer.

3. An air induction filter assembly as set forth in claim 1 wherein said post-filter foam layer is disposed adjacent an air outlet side of said carbon impregnated layer.

4. An air induction filter assembly comprising:

a housing;

a filter disposed in said housing;

said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter; and wherein said pre-filter foam layer has a porosity of approximately 15 ppi to approximately 45 ppi.

5. An air induction filter assembly comprising:

a housing;

a filter disposed in said housing;

said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter; and wherein said carbon impregnated foam layer has a porosity of approximately 15 ppi to approximately 30 ppi.

6. An air induction filter assembly comprising:

a housing;

a filter disposed in said housing;

said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter; and wherein said carbon impregnated foam layer contains carbon in an amount of approximately one hundred percent to approximately three hundred percent by weight of said foam layer.

7. An air induction filter assembly comprising:

a housing;

a filter disposed in said housing;

said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter; and wherein said post-filter foam layer has a porosity of approximately 45 ppi to approximately 100 ppi.

8. An air induction filter assembly as set forth in claim 7 wherein said pre-filter foam layer and said post-filter foam layer are treated with a tackifier.

9. An air induction filter assembly comprising:

a housing;

a filter disposed in said housing;

said filter having a plurality of individual and separate layers made of a foam material stacked together in a direction from a bottom of said housing to a top of said housing, said layers including a pre-filter foam layer disposed adjacent the bottom of said housing, a post-filter foam layer disposed adjacent the top of said housing, and a carbon impregnated foam layer disposed between said pre-filter foam layer and said post-filter foam layer to remove residual hydrocarbon (HC) vapors diffusing through an air inlet to said filter; and wherein said layers include a medium porosity foam layer disposed between said carbon impregnated foam layer and said post-filter foam layer.

10. An air induction filter assembly as set forth in claim 9 wherein said medium porosity foam layer has a porosity of approximately 45 to approximately 65 ppi.

11. An air induction filter assembly as set forth in claim 10 wherein said medium porosity foam layer is treated with a tackifier.

12. An air induction filter assembly comprising:

a housing for operative connection to an engine of a vehicle having an air cleaner tray and an air cleaner cover;

a filter disposed in said housing between said air cleaner tray and said air cleaner cover; and said filter having a plurality of individual and separate layers made of a foam material stacked together in a direction from a bottom of said air cleaner tray to a top of said air cleaner cover, said layers including a pre-filter foam layer disposed adjacent said air cleaner tray, a post-filter foam layer disposed adjacent said air cleaner cover, and a carbon impregnated foam layer disposed between said pre-filter foam layer and said post-filter foam layer to remove residual hydrocarbon (HC) vapors diffusing through an air inlet of the engine after the vehicle is shut-off.

13. An air induction filter assembly as set forth in claim 12 wherein said pre-filter foam layer is disposed on an air inlet side of said carbon impregnated foam layer.

14. An air induction filter assembly as set forth in claim 12 wherein said carbon impregnated foam layer contains carbon in an amount of approximately one hundred percent to approximately three hundred percent by weight of said foam layer.

15. An air induction filter assembly as set forth in claim 12 wherein said post-filter foam layer is disposed adjacent an air outlet side of said carbon impregnated layer.

16. An air induction filter assembly for an engine of a vehicle comprising:

a housing having an air cleaner tray and an air cleaner cover;

a filter disposed in said housing between said air cleaner tray and said air cleaner cover;

said filter having a plurality of individual and separate layers made of a foam material stacked together in a direction from a bottom of said air cleaner tray to a top of said air cleaner cover, said layers including a pre-filter foam layer disposed adjacent said air cleaner tray, a post-filter foam layer disposed adjacent said air cleaner cover, and a carbon impregnated foam layer disposed between said pre-filter foam layer and said post-filter foam layer to remove residual hydrocarbon (HC) vapors diffusing through an air inlet of the engine after the motor vehicle is shut-off; and wherein said pre-filter foam layer has a porosity of approximately 15 ppi to approximately 45 ppi.

17. An air induction filter assembly for an engine of a vehicle comprising:

a housing having an air cleaner tray and an air cleaner cover;

a filter disposed in said housing between said air cleaner tray and said air cleaner cover;

said filter having a plurality of individual and separate layers made of a foam material stacked together in a direction from a bottom of said air cleaner tray to a top of said air cleaner cover, said layers including a pre-filter foam layer disposed adjacent said air cleaner tray, a post-filter foam layer disposed adjacent said air cleaner cover, and a carbon impregnated foam layer disposed between said pre-filter foam layer and said post-filter foam layer to remove residual hydrocarbon (HC) vapors diffusing through an air inlet of the engine after the motor vehicle is shut-off; and wherein said carbon impregnated foam layer has a porosity of approximately 15 ppi to approximately 30 ppi.

18. An air induction filter assembly for an engine of a vehicle comprising:

a housing having an air cleaner tray and an air cleaner cover;

a filter disposed in said housing between said air cleaner tray and said air cleaner cover;

said filter having a plurality of individual and separate layers made of a foam material stacked together in a direction from a bottom of said air cleaner tray to a top of said air cleaner cover, said layers including a pre-filter foam layer disposed adjacent said air cleaner tray, a post-filter foam layer disposed adjacent said air cleaner cover, and a carbon impregnated foam layer disposed between said pre-filter foam layer and said post-filter foam layer to remove residual hydrocarbon (HC) vapors diffusing through an air inlet of the engine after the motor vehicle is shut-off; and wherein said post-filter foam layer has a porosity of approximately 45 ppi to approximately 100 ppi.

19. An air induction filter assembly as set forth in claim 18 wherein said post-filter foam layer is treated with a tackifier.

20. A vehicle comprising:

an engine;

a housing operatively connected to said engine having an air cleaner tray and an air cleaner cover;

a filter disposed in said housing between said air cleaner tray and said air cleaner cover; and said filter having a plurality of individual and separate layers made of a foam material stacked together in a direction from a bottom of said air cleaner tray to a top of said air cleaner cover, said layers including a pre-filter foam layer disposed adjacent said air cleaner tray, a post-filter foam layer disposed adjacent said air cleaner cover, and a carbon impregnated foam layer disposed between said pre-filter foam layer and said post-filter foam layer, said carbon impregnated layer having an air inlet side disposed adjacent the pre-filter foam layer for removing residual hydrocarbon (HC) vapors diffusing through an air inlet of said engine after the vehicle is shut-off.

* * * * *